US012574128B2

(12) United States Patent
Zhang et al.

(10) Patent No.: US 12,574,128 B2
(45) Date of Patent: Mar. 10, 2026

(54) CROSS LINK INTERFERENCE RESOURCE CAPABILITY

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 18/336,957

(22) Filed: Jun. 17, 2023

(65) Prior Publication Data

US 2024/0421922 A1     Dec. 19, 2024

(51) Int. Cl.
*H04B 17/336*          (2015.01)

(52) U.S. Cl.
CPC ................................. *H04B 17/336* (2015.01)

(58) Field of Classification Search
CPC ........................... H04L 5/0073; H04B 17/318
See application file for complete search history.

(56) References Cited

U.S. PATENT DOCUMENTS

| | | | | |
|---|---|---|---|---|
| 2021/0067991 | A1* | 3/2021 | Zhu | H04L 5/0051 |
| 2022/0312232 | A1* | 9/2022 | Nam | H04W 24/08 |
| 2023/0055304 | A1 | 2/2023 | Shim et al. | |
| 2024/0121019 | A1 | 4/2024 | Ibrahim et al. | |
| 2024/0243888 | A1* | 7/2024 | Ren | H04B 17/345 |

FOREIGN PATENT DOCUMENTS

| | | | | |
|---|---|---|---|---|
| WO | 2021042123 | 3/2021 | | |
| WO | WO-2023272717 A1* | 1/2023 | ............ | H04W 24/10 |

OTHER PUBLICATIONS

International Search Report and Written Opinion—PCT/US2024/032162—ISA/EPO—Sep. 17, 2024.
Qualcomm Incorporated: "UE Capabilities for CLI", R2-2005800, 3rd Generation Partnership Project (3GPP), Mobile Competence Centre, 650, Route Des Lucioles, F-06921, Sophia-Antipolis Cedex, France, vol. RAN WG2, No. Online, Jun. 1, 2020-Jun. 12, 2020, Jun. 15, 2020, 7 Pages, XP052358798, Section 4.2.9.

* cited by examiner

*Primary Examiner* — Zhiren Qin
(74) *Attorney, Agent, or Firm* — Patterson + Sheridan, L.L.P.

(57)               ABSTRACT

Certain aspects of the present disclosure provide techniques related to cross link interference (CLI) resource capability. An example method, performed at a user equipment (UE), includes outputting, for transmission, signaling indicating a quantity of resources the UE is capable of supporting, per a time unit or per a frequency unit, for measurement of at least cross link interference (CLI), obtaining a configuration in accordance with the indicated quantity of resources, measuring the CLI in accordance with the configuration, and outputting, for transmission, a CLI report based on the measuring.

26 Claims, 18 Drawing Sheets

1300

500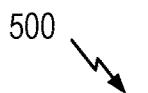
Use case 1
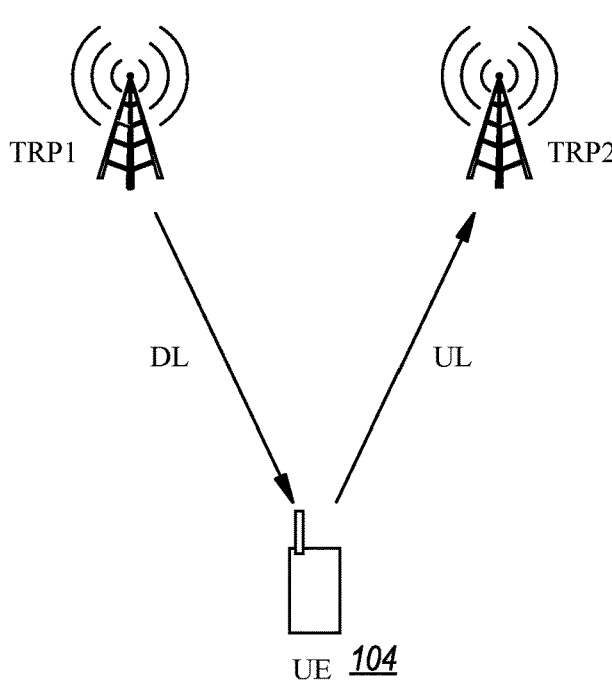
FIG. 5

600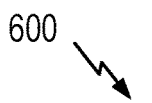
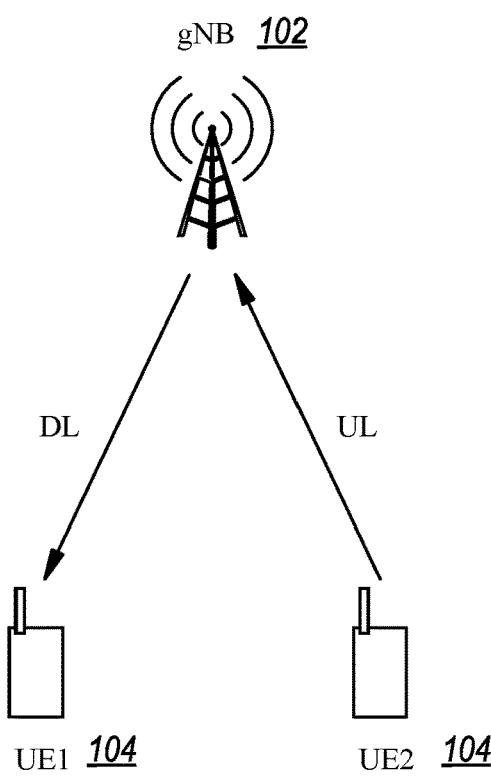
Use case 2
gNB _102_
DL           UL
UE1 _104_         UE2 _104_
FIG. 6

700

Use case 3

800

| gNB | UE | Comments |
|---|---|---|
| FD Disabled | FD Disabled | Baseline Operation |
| FD Disabled | FD Enabled | Use Case 1 for mTRP |
| FD Enabled | FD Disabled | Use Case 2 and IAB |
| FD Enabled | FD Enabled | Use Case 3 |

*FIG. 8*

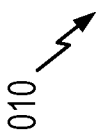
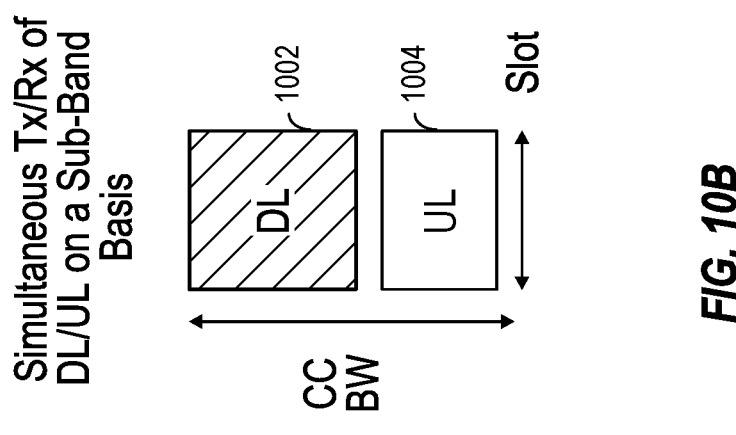
Simultaneous Tx/Rx of DL/UL on a Sub-Band Basis
*FIG. 10B*
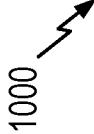
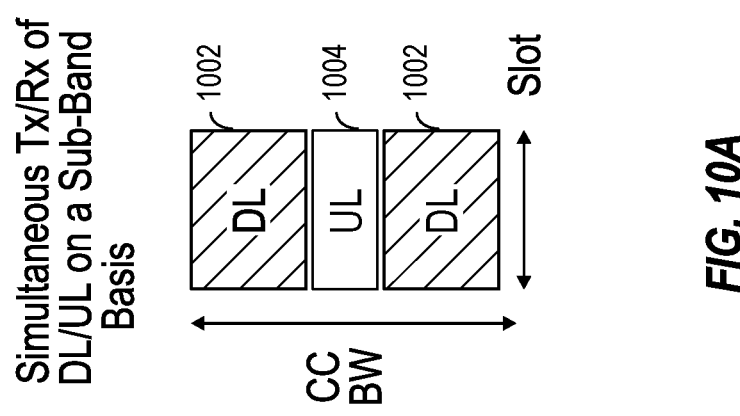
Simultaneous Tx/Rx of DL/UL on a Sub-Band Basis
*FIG. 10A*

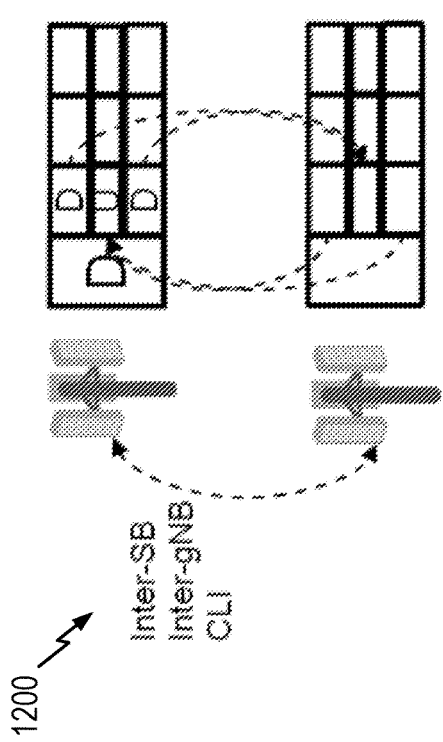
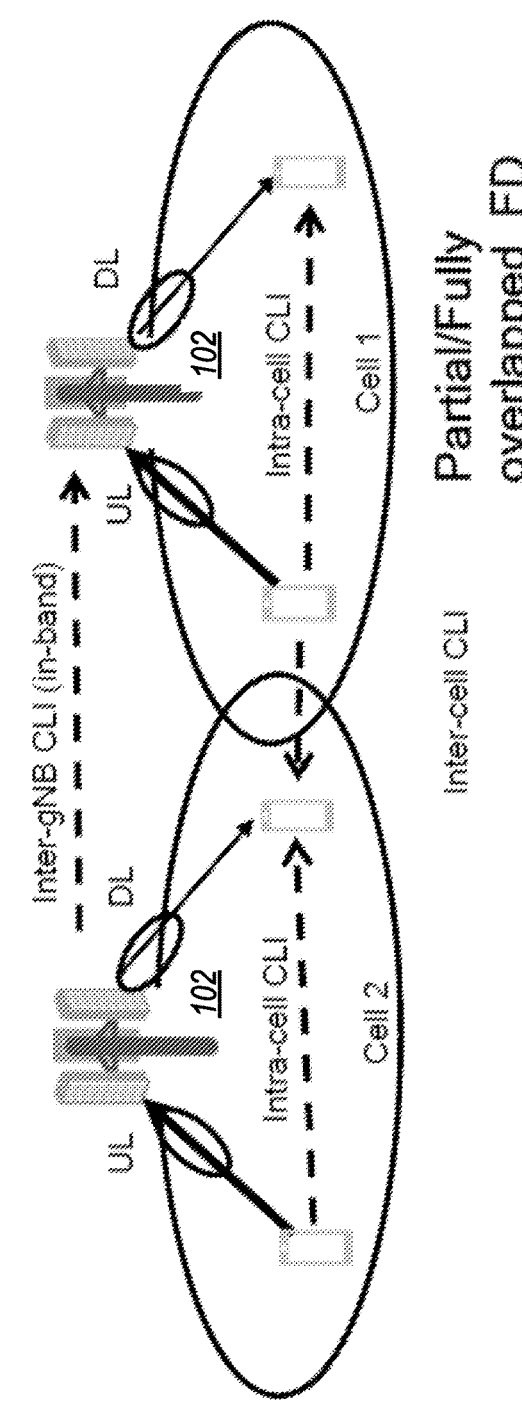
*FIG. 12*

A method for wireless communication at a network entity

Obtain signaling indicating a quantity of resources a user equipment (UE) is capable of supporting, per a time unit or per a frequency unit, for measurement of at least cross link interference (CLI)

1705

Output, for transmission, a configuration for the UE in accordance with the indicated quantity of resources

1710

1700

CROSS LINK INTERFERENCE RESOURCE CAPABILITY

BACKGROUND

Field of the Disclosure

Aspects of the present disclosure relate to wireless communications, and more particularly, to techniques related to cross link interference (CLI) resource capability.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a user equipment (UE). The method includes outputting, for transmission, signaling indicating a quantity of resources the UE is capable of supporting, per a time unit or per a frequency unit, for measurement of at least cross link interference (CLI); obtaining a configuration in accordance with the indicated quantity of resources; measuring the CLI in accordance with the configuration; and outputting, for transmission, a CLI report based on the measuring.

Another aspect provides a method for wireless communication at a network entity. The method includes obtaining signaling indicating a quantity of resources a user equipment (UE) is capable of supporting, per a time unit or per a frequency unit, for measurement of at least cross link interference (CLI); and outputting, for transmission, a configuration for the UE in accordance with the indicated quantity of resources.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 5-8 depict different use cases for full-duplex (FD) communications.

FIGS. 10A and 10B depict example sub-band full duplex (SBFD) slot configuration.

FIG. 11 and FIG. 12 depict examples of cross link interference (CLI).

DETAILED DESCRIPTION

Aspects of the present disclosure provide apparatuses, methods, processing systems, and computer-readable mediums related to cross link interference (CLI) resource capability.

Full duplex (FD) communication generally refers to a mode of communication where signals can be transmitted and received simultaneously over a single communication channel. In an FD mode, simultaneous transmission between wireless nodes may occur. In some cases, a wireless node comprises a UE or a network entity. Sub-band full duplex (SBFD) generally refers to a mode where a time division duplex (TDD) carrier is split into uplink and downlink sub-bands to enable simultaneous transmission and reception (on different subbands) in a same slot that consists of multiple symbols.

Cross-link interference (CLI) refers to a phenomenon that occurs in wireless communication systems, particularly in cellular networks, where interference is caused between UEs in a same cell (e.g., intra-cell CLI) or different cells (e.g., inter-cell CLI). CLI typically arises when the transmission signals from one UE interfere with the reception signals of another neighboring UE. In other words, when UEs that neighbor each other communicate, CLI may be caused by the neighboring UEs (and/or network entities cells that serve the neighboring UEs) performing/scheduling uplink and downlink communications on the same frequency resources at the same time.

To manage CLI, some systems configure certain resources (CLI resources) for one UE (referred to as an aggressor UE) to transmit reference signals (RSs) while another UE (referred to as a victim UE) measures. The aggressor UE may transmit (RS on) different CLI resources using different transmit beams.

Aspects of the present disclosure provide techniques for indication of CLI resource capability of a UE (e.g., a number/quantity of CLI resources that a UE is capable of supporting). As will be described in greater detail below, the indication of the UE capability may be per slot and/or component carrier (CC) for CLI measurement. Utilization of the techniques disclosed herein may allow for greater flexibility in CLI resource configuration and reporting based on UE capability, leading to improved throughput and reliability of communications in wireless networks, and improved efficacy in CLI mitigation.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
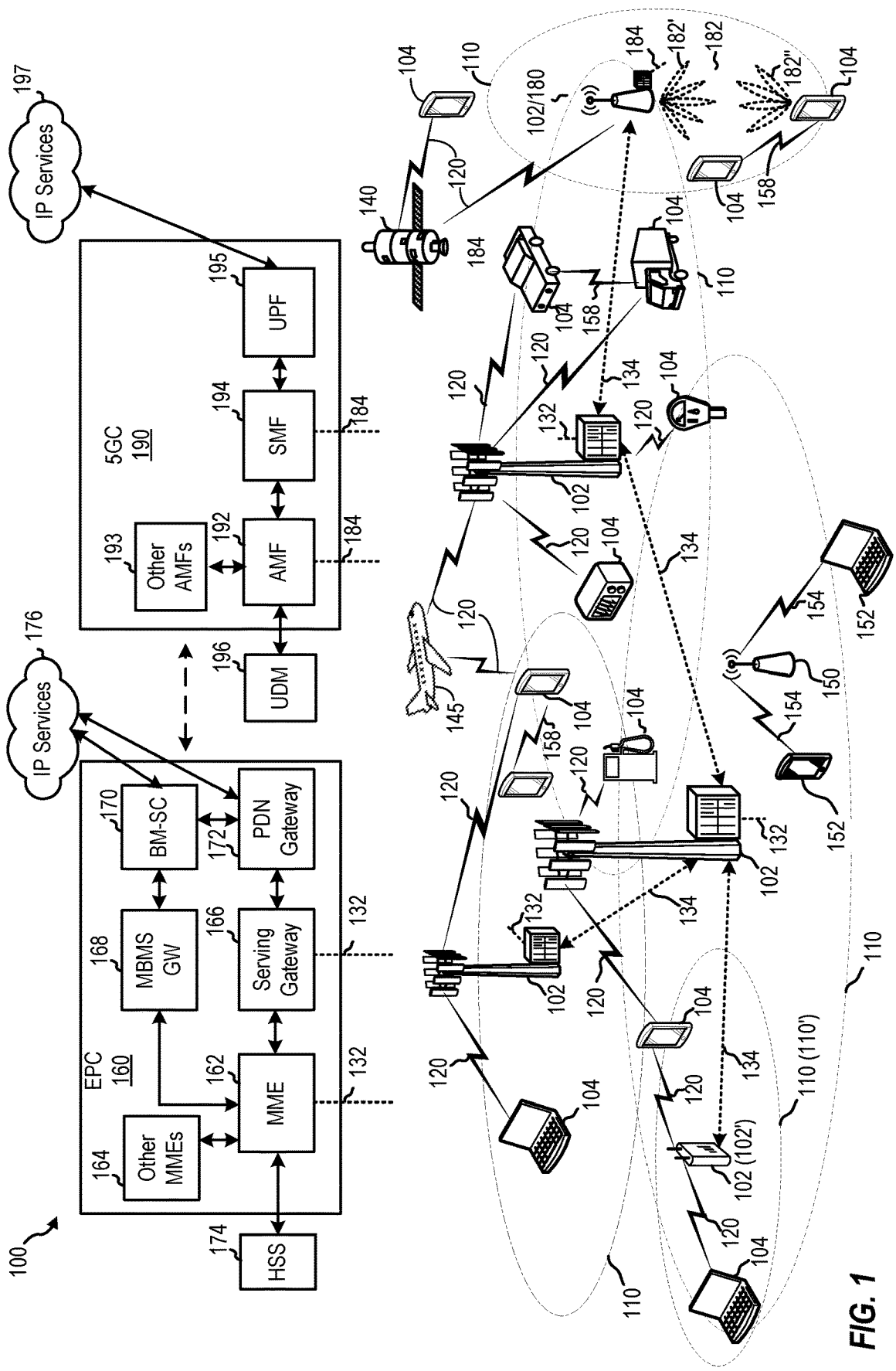
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
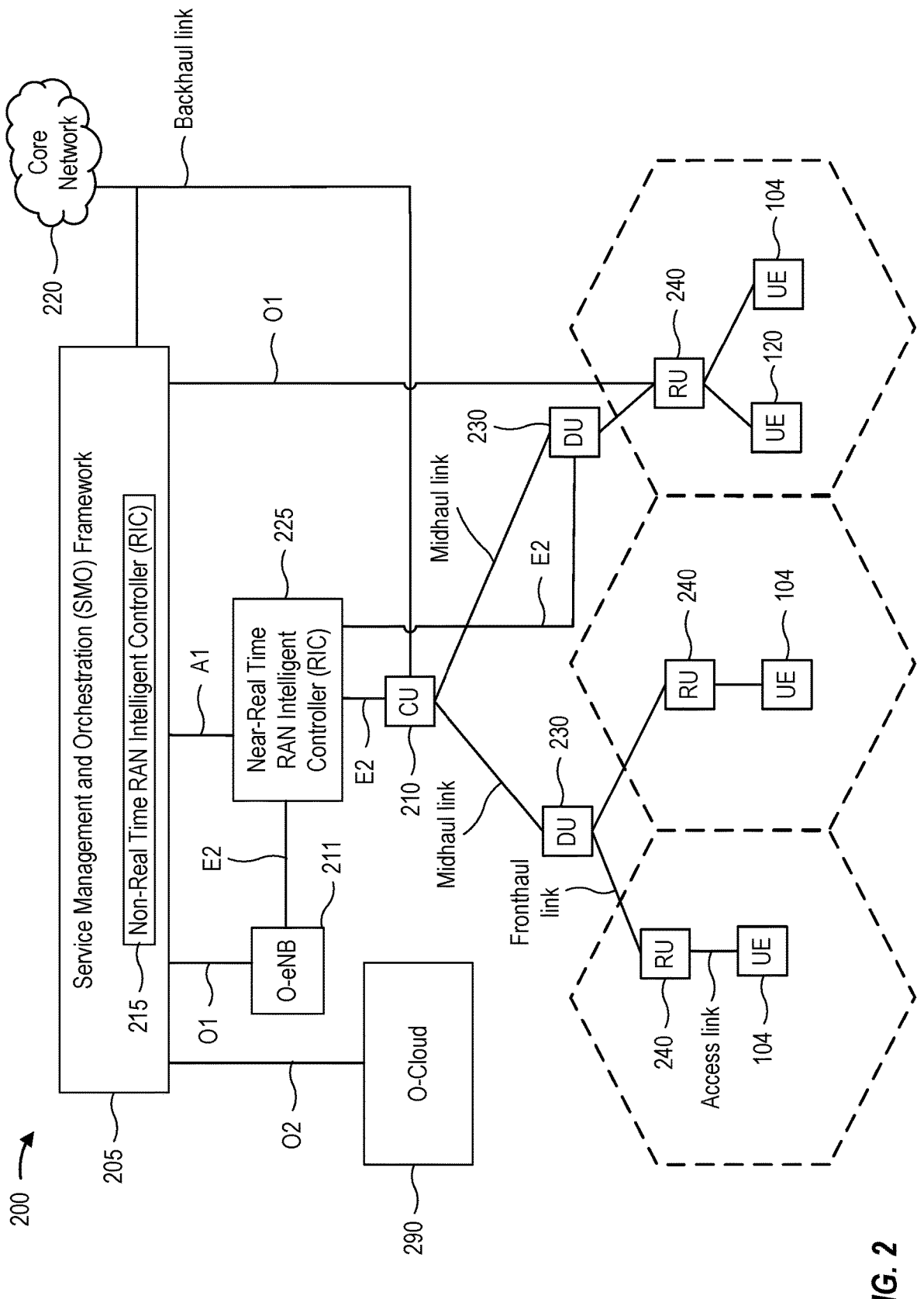
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG- RAN)) may interface with 5GC 190 through second back-haul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
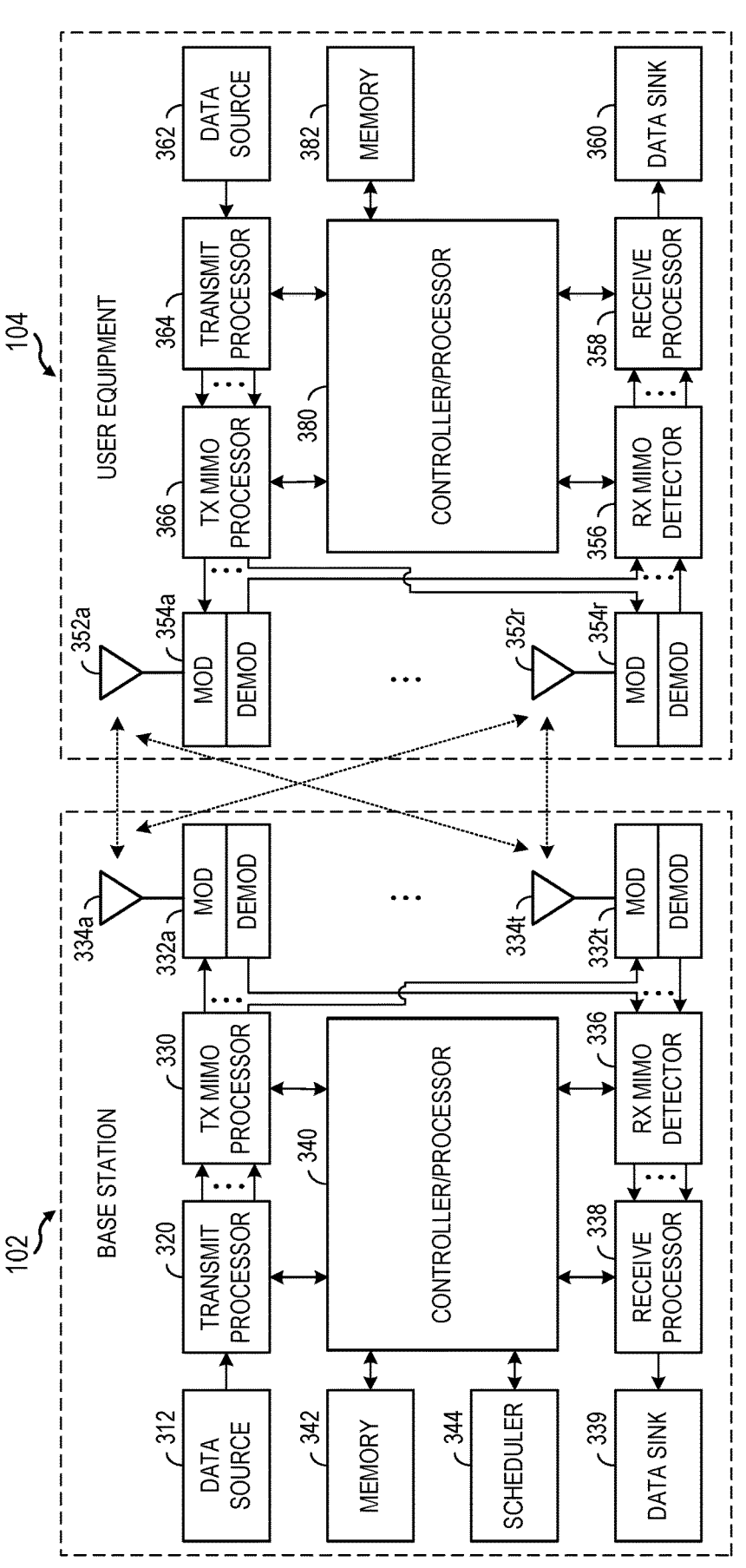
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
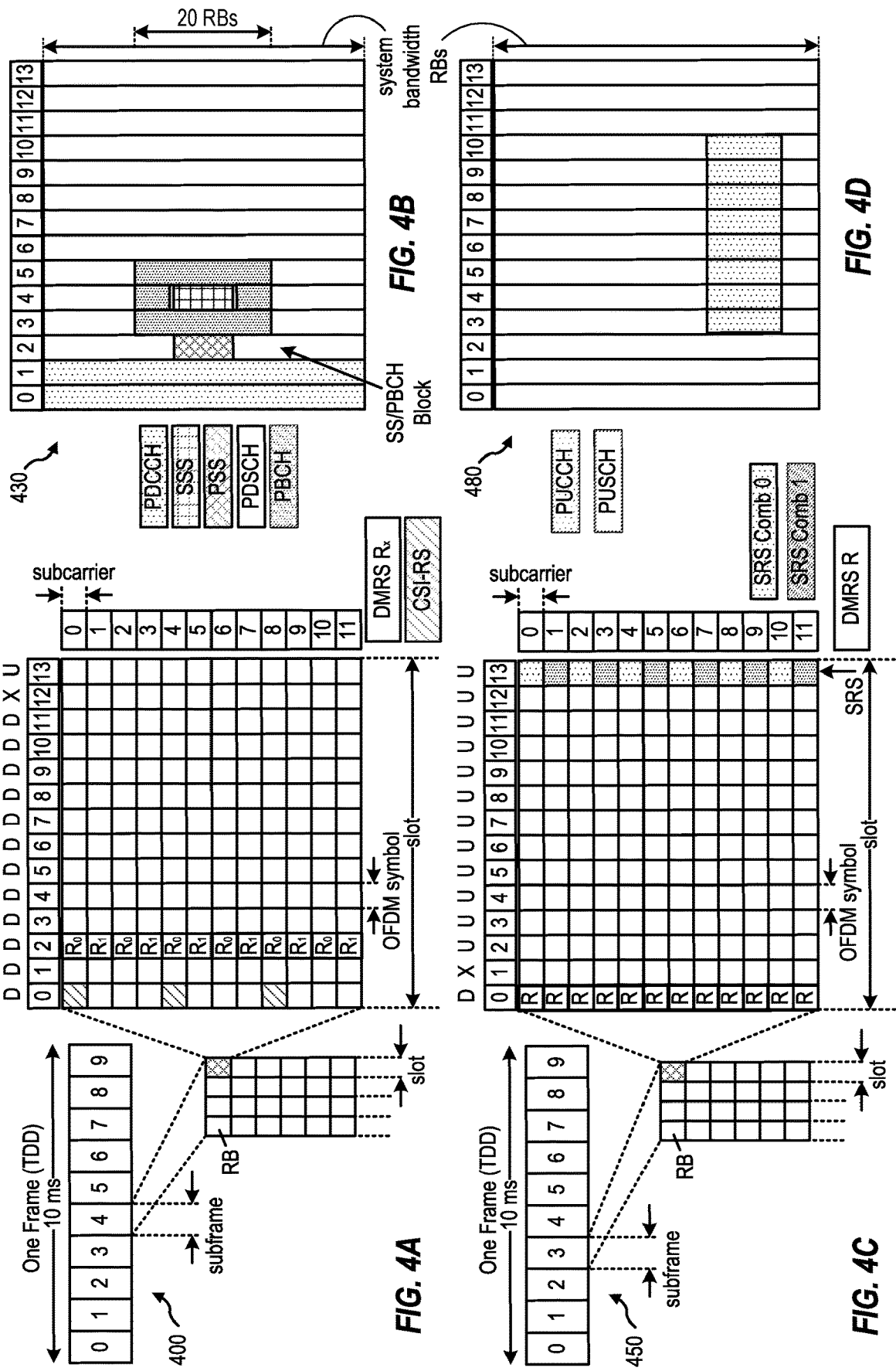
FIGS. 4A, 4B, 4C, and 4D depict various example aspects of data structures for a wireless communications network.
Figure 7:
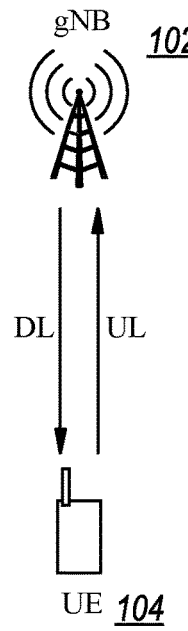

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The sub-carrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full-Duplex (FD) Operation

As compared to older communication standards, spectrum options for 5G new radio (NR) are considerably expanded. For example, a frequency range 2 (FR2) band extends from approximately 24 GHz to 60 GHz. Since the wavelength decreases as the frequency increases, the FR2 band is denoted as a millimeter wave band due to its relatively-small wavelengths. In light of this relatively short wavelength, the transmitted radio frequency (RF) signals in the FR2 band behave somewhat like visible light. Thus, just like light, millimeter-wave signals are readily shadowed by buildings and other obstacles. In addition, the received power per unit area of antenna element goes down as the frequency goes up. For example, a patch antenna element is typically a fraction of the operating wavelength (e.g., one-half of the wavelength) in width and length. As the wavelength goes down (and thus the size of the antenna element decreases), it may thus be seen that the signal energy received at the corresponding antenna element decreases. Millimeter-wave cellular networks will generally require a relatively-large number of base stations (BSs) due to the issues of shadowing and decreased received signal strength. A cellular provider must typically rent the real estate for the BSs such that widespread coverage for a millimeter-wave cellular network may become very costly.

As compared to the challenges of FR2, the electromagnetic properties of radio wave propagation in the sub-6 GHz bands are more accommodating. For example, the 5G NR frequency range 1 (FR1) band extends from approximately 0.4 GHz to 7 GHz. At these lower frequencies, the transmitted RF signals tend to refract around obstacles such as buildings so that the issues of shadowing are reduced. In addition, the larger size for each antenna element means that a FR1 antenna element intercepts more signal energy as compared to an FR2 antenna element. Thus, just as was established for older networks, a 5G NR cellular network operating in the FR1 band will not require an inordinate amount of BSs. Given the favorable properties of the lower frequency bands, the sub-6 GHz bands are often denoted as "beachfront" bands due to their desirability.

One issue with operation in the sub-6 GHz bands is that there is only so much bandwidth available. For this reason, Federal Communications Commission regulates the airwaves and conducts auctions for the limited bandwidth in the FR1 band. Given this limited bandwidth, it is challenging for a cellular provider to enable the high data rates that would be more readily achieved in the FR2 band. To meet these challenges, a "sub-band full duplex" (SBFD) network architecture is implemented, which is quite advantageous as it offers users the high data rates that would otherwise require usage of the FR2 band. The SBFD network architecture described herein provides the high data rates in the FR1 band, and thus lowers costs due to the smaller number of BSs per given area of coverage that may be achieved in the FR1 band as compared to the FR2 band.

Typically, each one millisecond (ms) subframe may consist of one or multiple adjacent slots. For example, one subframe includes four slots. In a four-slot structure, first two slots may be downlink (DL) slots whereas a final one of the fours slots is an uplink (UL) slot. The third slot is a special slot in which some symbols may be used for UL transmissions and others for DL transmissions. The resulting UL and DL traffic is thus time division duplexed (TDD) as arranged by the dedicated slots and as arranged by the symbol assignment in the special slot. Since the UL has only a single dedicated slot, UL communication may suffer from excessive latency since a user equipment (UE) is restricted to transmitting in the single dedicated UL slot and in the resource allocations within the special slot. Since there is only one dedicated UL slot in the repeating four-slot structure, the resulting latency can be problematic particularly for low-latency applications such as vehicle-to-vehicle communication. In addition, the energy for the UL communication is limited by its single dedicated slot.

To reduce uplink latency and increase the energy for the UL transmissions, SBFD mode may be implemented. The SBFD mode is a duplex mode with a TDD carrier split into sub-bands to enable simultaneous transmission and reception in same slots. For example, in the SBFD mode, some slots are modified as SBFD slots to support frequency duplexing for simultaneous UL and DL transmissions. Some slots may remain as legacy TDD slots where one slot is still dedicated to DL and another slot dedicated to UL. In one example four-slot structure, in the SBFD mode, the second and third slots may be SBFD slots modified to support frequency duplexing for simultaneous UL and DL transmissions. The first slot and the fourth slot may remain as legacy TDD slots such that the first slot is still dedicated to DL and the fourth slot dedicated to UL. In other examples, any slot may be used in the SBFD mode.

In the sub-6 GHz spectrum, the relatively-limited separation between antennas on a device will lead to substantial self-interference should the device engage in a simultaneous UL and DL transmission. In some cases, the frequency duplexing in the SBFD slots may be practiced by a BS transceiver.

Figures 9A, 9B, 9C:
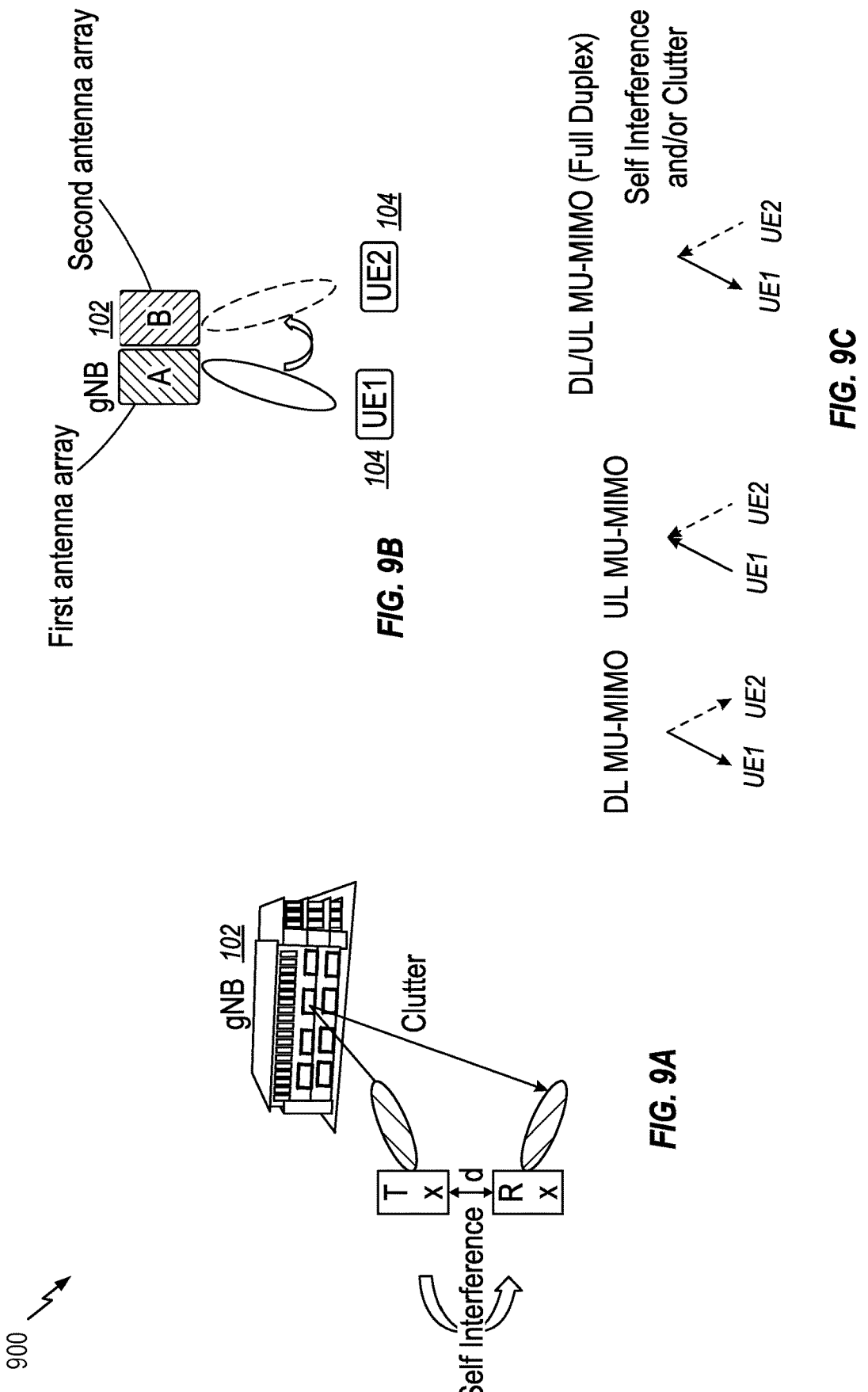
FIGS. 9A, 9B, and 9C depict examples of FD operation at a gNodeB (gNB).

For example, diagram 900 of FIG. 9A depicts full-duplex (FD) operation at a gNodeB (gNB) 102. An antenna system for the gNB is subdivided into a first antenna array that is separated from a second antenna array by an insulating distance such as, for example, 10 to 30 cm. As illustrated in FIG. 9B, during the SBFD operation, one of the antenna arrays transmits (e.g., to a first UE (UE1)) while the other antenna array is receiving (e.g., from a second UE (UE2)). As illustrated in FIG. 9C, CLI may occur in DL MU-MIMO, where a DL transmission from UE1 potentially interferes with reception by UE2, as well as UL MU-MIMO, where an UL transmission from UE1 potentially interferes with an UL transmission from UE2. In a FD scenario, in addition to CLI, UEs may be subject to self-interference and/or clutter.

The self-interference problem is partially addressed by a physical separation between the antenna arrays of the gNB. To provide additional isolation, a conducting shield between the antenna arrays of the gNB may also be implemented. It will be appreciated, however, that frequency duplexing may also be practiced by the device (or more generally, a UE) should the device practice sufficient self-interference cancellation. In other cases, however, the UE may be limited to half-duplex (HD) transmission such that the UE's antenna array is entirely dedicated to just transmitting or to just receiving in respective slots.

Example SBFD slots are depicted in FIG. 10A and FIG. 10B. For example, FIG. 10A depicts SBFD slot 1000 and FIG. 10B depicts SBFD slot 1010. Note that neither the UL nor the DL in the SBFD slots 1000, 1010 may occupy an entire frequency resource range (e.g., a frequency band) for these SBFD slots.

As depicted in FIG. 10A, the UL occupies a central sub-band in the frequency band for the SBFD slot 1000. The DL occupies a lower sub-band that ranges from a lower frequency for the frequency band up to a lowest frequency for the UL central sub-band. In some cases, the sub-bands may be separated by a guard band. The DL also occupies an upper sub-band in the frequency band and extends from a greatest frequency for the UL central sub-band to a greatest frequency for the frequency band. In one example, the UL central sub-band may be symmetric about a center frequency for the SBFD slot 1000. In such example, the bandwidth for the DL lower sub-band and the DL upper sub-band would be equal. However, in other examples, the DL lower sub-band bandwidth may be different from the bandwidth for the DL upper sub-band. In some examples, the DL upper and lower sub-bands may each have the bandwidth that may vary as 10 MHZ, 20 MHZ, 30 MHz or 40 MHz depending upon a DL data rate.

The use of the SBFD slot is advantageous with regard to minimizing or reducing UE-to-UE interference and transmit-to-receive self-interference at a BS. In some cases, the use of the SBFD slot may also enhance system capacity, improve resource utilization and spectrum efficiency (e.g., by enabling flexible and dynamic UL/DL resource adaption according to UL/DL traffic in a robust manner).

Figure 11:
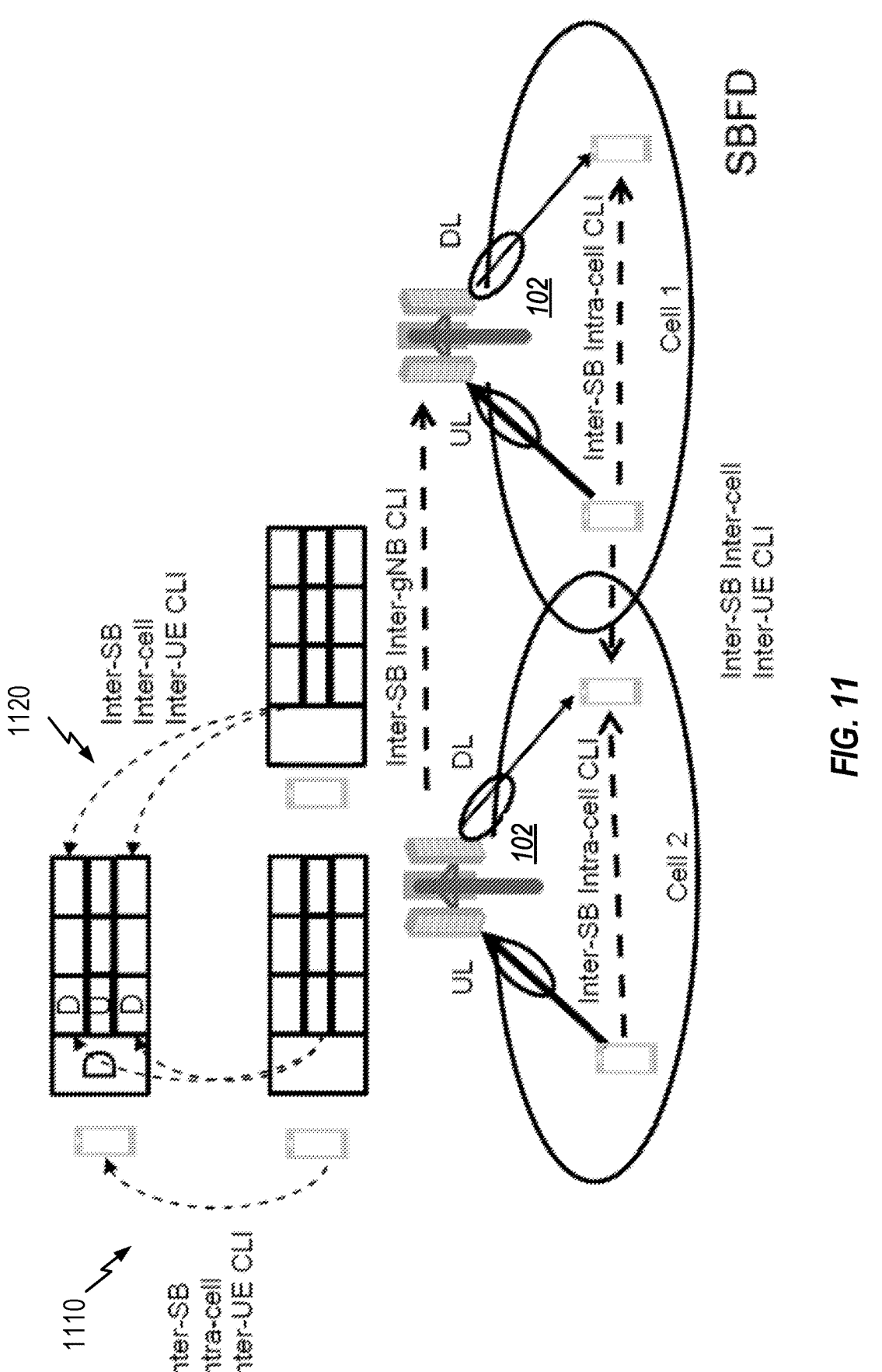

FIGS. 11 and 12 depict examples of intra-cell and inter-cell CLI in adjacent cells (Cell 1 and Cell 2) operating with SBFD. The example assumes that a slot may be configured with both uplink (U) and downlink (D) subbands. As illustrated at 1110, this may result in (inter-SB and) intra-cell CLI in Cell 2 when a first UE transmits on the UL subband while another UE is receiving on a DL subband. Further, as illustrated at 1120, UL transmissions from a UE in Cell 1 may result in (inter-SB and) inter-cell CLI. Still further, as illustrated at 1200 of FIG. 12, inter-gNB may also occur when a gNB in one cell transmits while the gNB in the other cell is receiving.

In some wireless communications standards (e.g., 3GPP R16), a number (e.g., maxReportCLI) of most interfering CLI resources may be reported in either periodic or event triggered report.

Various parameters may be reported by a UE to indicate support of CLI resource measurement and reporting.

For example, a UE may report a parameter (e.g., cli-RSSI-Meas-r16) that indicates whether the UE can perform CLI RSSI measurements and supports periodical reporting and measurement event triggering. If the UE supports this feature, the UE may also report a parameter maxNumberCLI-RSSI-r16.

A UE may also report a parameter (e.g., cli-SRS-RSRP-Meas-r16) that indicates whether the UE can perform SRS RSRP measurements and supports periodical reporting and measurement event triggering based on SRS-RSRP. If the UE supports this feature, the UE may also report maxNumberCLI-SRS-RSRP-r16 and maxNumberPerSlotCLI-SRS-RSRP-r16. maxNumberPerSlotCLI-SRS-RSRP-r16 generally refers to the maximum number of SRS-RSRP measurement resources per slot for SRS-RSRP measurement. If the UE supports cli-SRS-RSRP-Meas-r16, the UE may report this capability.

A UE may also report a parameter (e.g., csi-RS-IM-ReceptionForFeedback) that indicates support of CSI-RS and CSI-IM reception for CSI feedback. This capability signalling may indicate the following parameters: maxConfigNumberNZP-CSI-RS-PerCC that indicates a maximum number of configured NZP-CSI-RS resources per CC; maxConfigNumberPortsAcrossNZP-CSI-RS-PerCC that indicates the maximum number of ports across all configured NZP-CSI-RS resources per CC; maxConfigNumber-CSI-IM-PerCC that indicates the maximum number of configured CSI-IM resources per CC; maxNumberSimultaneousNZP-CSI-RS-PerCC that indicates the maximum number of simultaneous CSI-RS-resources per CC; and/or totalNumberPortsSimultaneous-NZP-CSI-RS-PerCC that indicates the total number of CSI-RS ports in simultaneous CSI-RS resources per CC.

In some cases, a UE may report csi-RS-IM-Reception-ForFeedback. A UE may also report a parameter (e.g., csi-RS-IM-ReceptionForFeedbackPerBandComb) that indicates support of CSI-RS and CSI-IM reception for CSI feedback. This capability signalling comprises the following parameters: maxNumberSimultaneousNZP-CSI-RS-ActBWP-AllCC that indicates the maximum number of simultaneous CSI-RS resources in active BWPs across all CCs, and across MCG and SCG in case of NR-DC. This parameter may limit a total number of NZP-CSI-RS resources that the NW may configure across all CCs, and across MCG and SCG in case of NR-DC (irrespective of the associated codebook type). The network may apply this limit in addition to other limits signaled (e.g., in MIMO-ParametersPerBand→maxNumberSimultaneousNZP-CSI-RS-PerCC and/or in Phy-ParametersFRXDiff→maxNumberSimultaneousNZP-CSI-RS-PerCC).

A UE may also signal a totalNumberPortsSimultaneous-NZP-CSI-RS-ActBWP-AllCC that indicates the total number of CSI-RS ports in simultaneous CSI-RS resources in active BWPs across all CCs, and across MCG and SCG in case of NR-DC. This parameter limits the total number of ports that the NW may configure across all NZP-CSI-RS resources across all CCs, and across MCG and SCG in case of NR-DC (irrespective of the associated codebook type). The network may apply this limit in addition to other limits signaled (e.g., in MIMOParametersPerBand→totalNumber-PortsSimultaneousNZP-CSI-RS-PerCC and/or in Phy-ParametersFRX-Diff→totalNumberPortsSimultaneousNZP-CSIRS-PerCC).

Aspects Related to Indicating UE CLI Resource Capability

Aspects of the present disclosure provide techniques for indication of CLI resource capability of a UE (e.g., a number of CLI resources that a UE is capable of supporting). As will be described in greater detail below, the indication of the UE capability may be per slot and/or component carrier (CC) for CLI measurement.

Figure 13:
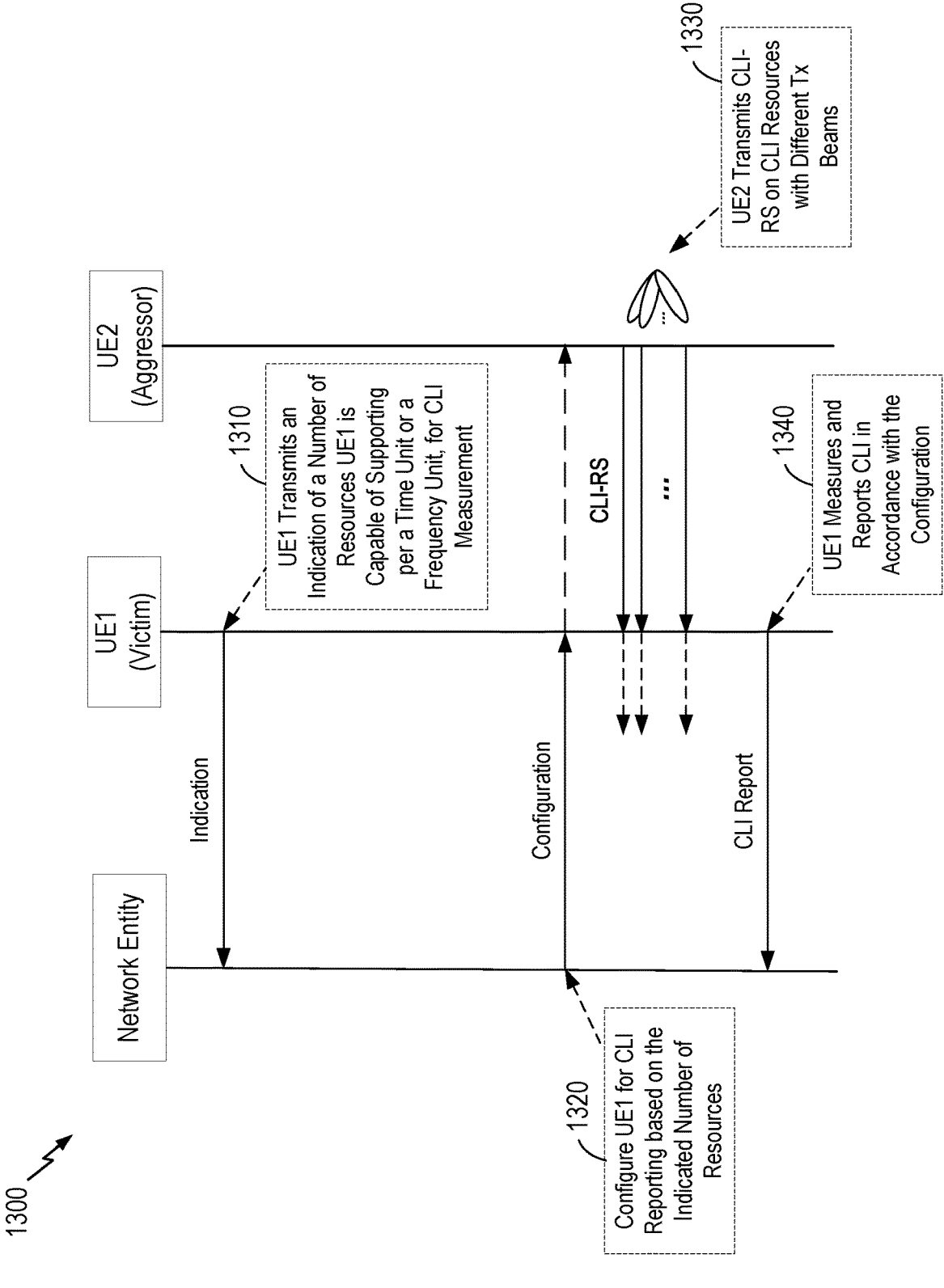
FIGS. 13-15 depict call flow diagrams for indicating UE capability regarding CLI resources, in accordance with certain aspects of the present disclosure.

The techniques proposed herein may be understood with reference to the call flow diagram 1300 of FIG. 13. In some aspects, the UEs shown in FIG. 13, FIG. 14, and/or FIG. 15 may be examples of the UE 104 depicted and described with respect to FIGS. 1 and 3. Similarly, the network entities shown in FIG. 13, FIG. 14, and/or FIG. 15 may be example of the BS 102 (e.g., a gNB) depicted and described with respect to FIGS. 1 and 3 or a disaggregated base station depicted and described with respect to FIG. 2.

The example assumes an aggressor UE, UE2, has been configured to transmit CLI-RS (e.g., SRS) on CLI resources. Similarly, the example assumes a victim UE, UE1, has been configured to measure the CLI-RS and report CLI measurement results.

As illustrated at 1310, UE1 may transmit signaling of an indication of a number (e.g., a maximum number) of resources (e.g., CLI resources) that UE1 is capable of supporting per a time unit (e.g., a slot) or per a frequency unit (e.g., a CC) for CLI measurement. In this context, signaling may refer to a PUSCH transmission, a PUCCH transmission, or any other type of uplink message or uplink signaling.

As illustrated at 1320, the network entity may transmit a configuration, configuring at least UE1 for CLI reporting based on the indicated number of resources.

As illustrated at 1330, UE2 may transmit CLI-RS on CLI resources with different transmission beams.

As illustrated at 1340, UE1 may measure the CLI-RS and transmit a CLI report to the network entity, in accordance with the configuration.

Certain aspects of the present disclosure provide techniques involving a new parameter defined (e.g., in wireless communication standards) as a max number of CLI RSRP measurement resources per slot for SRS-RSRP measurement. This parameter may be based on UE capability (e.g., which may be indicated via UE capability signaling) and/or wireless communication standards specification rules. The new parameter may be defined for or applied to L1 CLI measurements or any L1/L2/L3 measurements (e.g., if overlapped in a slot).

Certain aspects of the present disclosure provide techniques involving a new parameter defined (e.g., in wireless communication standards) as a maximum number of CLI RSSI measurement resources per slot for CLI-RSSI measurement. Such a parameter may be based on UE capability (e.g., which may be indicated via UE capability signaling) and/or wireless communication standards specification rules. The new parameter may be defined for or applied to L1 CLI measurements or any L1/L2/L3 measurements if overlapped in a slot.

In some cases, a UE may indicate support of CSI-RS, CSI-IM and CLI reception for CSI+CLI feedback. In such cases, a new parameter may be defined as a new maximum number of CLI RSRP measurement resources and CSI measurement resources (e.g., that the UE supports collectively) per slot for SRS-RSRP and CSI measurement. Such a parameter may be based on UE capability (e.g., which may be indicated via UE capability signaling) and/or wireless communication standards specification rules.

Aspects of the present disclosure provide techniques involving a new parameter defined (e.g., in wireless communication standards) as a new max number of CLI RSSI measurement resources CSI measurement resources per slot for CLI-RSSI measurement CSI measurement resources. Such a parameter may be based on UE capability (e.g., which may be indicated via UE capability signaling) and/or wireless communication standards specification rules. The new parameter may be defined for or applied to L1 CLI measurements or any L1/L2/L3 measurements if overlapped in a slot.

In some cases, a UE may signal a maximum number of configured CLI resources the UE supports per CC.

Figure 14:
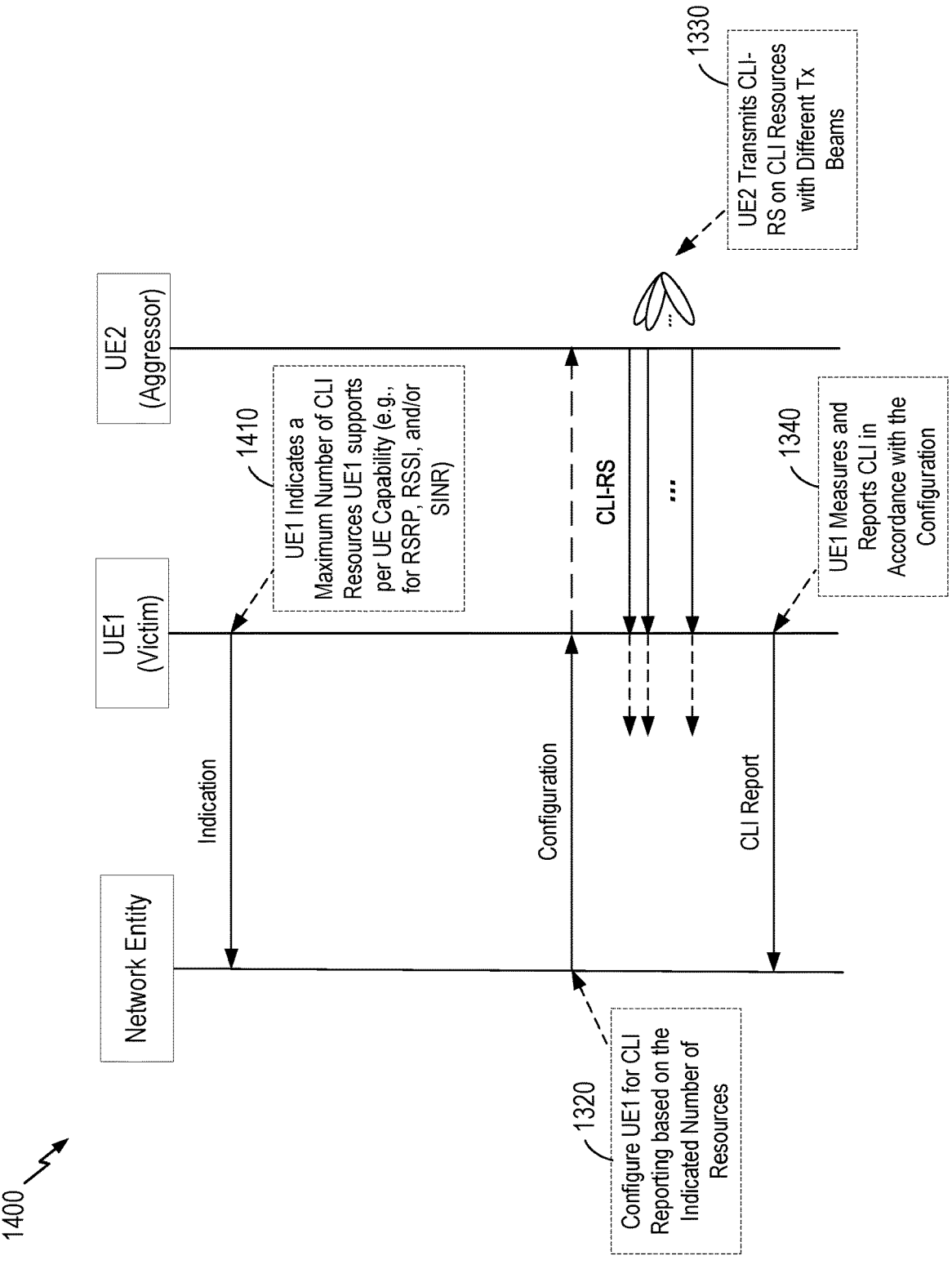

FIG. 14 depicts a call flow diagram 1400 in which a UE signals a maximum number of configured CLI resources the UE reports per CC, in accordance with certain aspects of the present disclosure.

As illustrated at 1410, UE1 may transmit an indication of a Maximum Number of CLI Resources UE1 supports per UE Capability (e.g., for RSRP, RSSI, and/or SINR).

In some cases, a UE may indicate a maximum number of configured CLI resources the UE supports per CC for measuring CLI RSRP measurement resources, CLI RSSI measurement resources, or CLI signal to interference and noise ratio (SINR) measurement resources.

For example, the UE may report a maxConfigNumberC-LIRSRP-PerCC parameter or a maxConfigNumberC-LIRSSI-Per CC parameter to indicate a maximum number of configured CLI resources (CLI-RSRP or CLI-RSSI resources) supported per CC. In some aspects, the UE may report a maxConfigNumberNZP-CSI-RS-CLI-x-PerCC parameter to indicate a maximum number of configured NZP CSI-RS and CLI resources (e.g. CLI-RSRP or CLI-RSSI resources) supported per CC.

In some aspects, a UE may report a totalNumberSimul-taneousCLIRSRP-PerCC parameter or a totalNumberSimul-taneousCLIRSRP-PerCC parameter to indicate a total number of simultaneous CLI resources (CLI-RSRP or CLI-RSSI resources) supported per CC.

In some aspects, a UE may report a totalNumberSimul-taneousNZP-CSI-RS-CLI-x-PerCC parameter to indicate a total number of simultaneous NZP CSI-RS and CLI resources (e.g. CLI-RSRP or CLI-RSSI resources) supported per CC.

In some aspects, a UE may report a maxConfigNumber-PortsAcrossCLI-x-perCC parameter to indicate a maximum number of ports across all configured CLI resources (CLI-RSRP or CLI-RSSI resources) supported per CC.

In some aspects, a UE may report a maxConfigNumber-PortsAcrossNZP-CSI-RS-CLI-x-PerCC parameter to indicate a maximum number of ports across all configured NZP CSI-RS and CLI resources (e.g. CLI-RSRP or CLI-RSSI resources) supported per CC.

In some aspects, a UE may report a totalNumberPortsSi-multaneousCLI-x-perCC parameter to indicate a total number of ports in simultaneous CLI resources (CLI-RSRP or CLI-RSSI resources) supported per CC.

In some aspects, a UE may report a totalNumberPortsSi-multaneousNZP-CSI-RS-CLI-x-PerCC parameter to indicate the total number ports in simultaneous NZP CSI-RS and CLI resources (e.g. CLI-RSRP or CLI-RSSI resources) supported per CC.

In some cases, a UE may signal a maximum number of simultaneous CLI resources the UE simultaneously supports in active bandwidth parts (BWPs).

Figure 15:
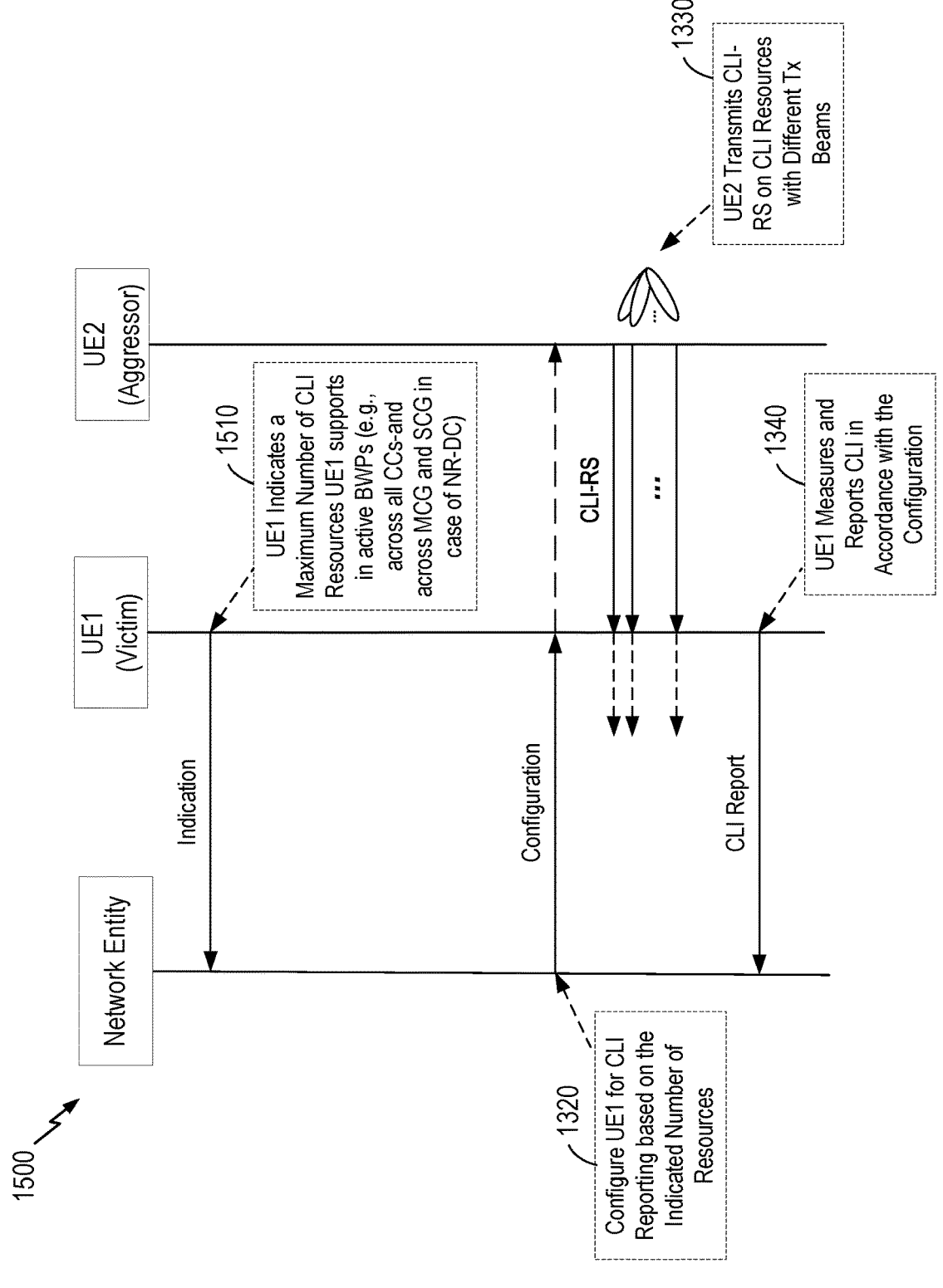

FIG. 15 depicts a call flow diagram 1500 in which a UE signals a maximum number of configured CLI resources the UE reports in active BWPs, in accordance with certain aspects of the present disclosure.

As illustrated at 1510, UE1 may transmit an indication of a maximum number of CLI Resources UE1 supports in active BWPs (e.g., across all CCs). In the case of NR dual connectivity (NR-DC), UE1 may indicate a maximum number of CLI resources UE1 supports across a master cell group (MCG) and secondary cell group (SCG).

In some cases, a UE may report a maxNumberSimulta-neousCLIRSRP-ActBWP-AllCC parameter or a maxNum-berSimultaneousCLIRSSI-ActBWP-AllCC parameter to indicate a maximum number of simultaneous CLI resources (CLI-RSRP or CLI-RSSI resources) supported in active BWPs across all CCs and across MCG and SCG (e.g., in NR-DC scenarios).

In some cases, a UE may report a maxNumberSimulta-neousNZP-CSI-RS-CLI-x-ActBWP-AllCC parameter to indicate a maximum number of simultaneous CSI and CLI resources (CLI-RSRP or CLI-RSSI resources) supported in active BWPs across all CCs and across MCG and SCG.

In some aspects, a UE may report a totalNumberPortsSi-multaneousCLI-x-ActBWP-AllCC parameter to indicate a total number of ports supported in simultaneous CLI resources (CLI-RSRP or CLI-RSSI resources) in active BWPs across all CCs and across MCG and SCG.

In some aspects, a UE may report a totalNumberPortsSi-multaneousNZP-CSI-RS-CLI-x-ActBWP-AllCC parameter to indicate a total number of ports supported in simultaneous CSI and CLI resources (CLI-RSRP or CLI-RSSI resources) in active BWPs across all CCs and across MCG and SCG.

In the examples above, the x (as used in the parameters described above) may refer to a measured parameter. For example x could indicate RSRP, RSSI, and/or SINR. In some aspects, the parameters described above may be defined in wireless communications standards specifications.

Example Operations

Figure 16:
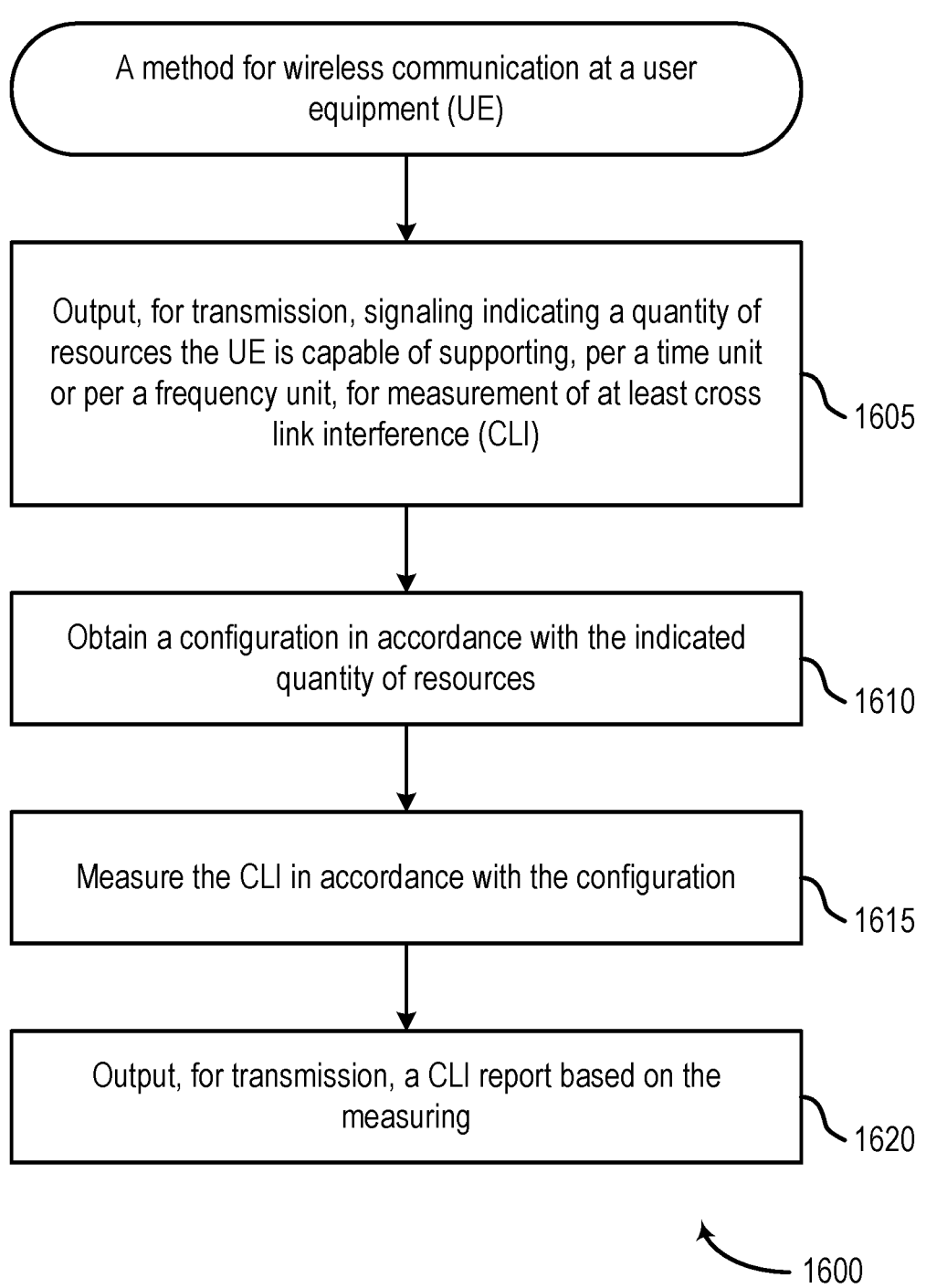
FIG. 16 depicts a method for wireless communications.

FIG. 16 shows an example of a method 1600 of wireless communication at a user equipment (UE), such as a UE 104 of FIGS. 1 and 3.

Method 1600 begins at step 1605 with outputting, for transmission, signaling indicating a quantity of resources the UE is capable of supporting, per a time unit or per a frequency unit, for measurement of at least cross link interference (CLI). In some cases, the operations of this step refer to, or may be performed by, circuitry for outputting and/or code for outputting as described with reference to FIG. 18.

Method 1600 then proceeds to step 1610 with obtaining a configuration in accordance with the indicated quantity of resources. In some cases, the operations of this step refer to, or may be performed by, circuitry for obtaining and/or code for obtaining as described with reference to FIG. 18.

Method 1600 then proceeds to step 1615 with measuring the CLI in accordance with the configuration. In some cases, the operations of this step refer to, or may be performed by, circuitry for measuring and/or code for measuring as described with reference to FIG. 18.

Method 1600 then proceeds to step 1620 with outputting, for transmission, a CLI report based on the measuring. In some cases, the operations of this step refer to, or may be performed by, circuitry for outputting and/or code for outputting as described with reference to FIG. 18.

In some aspects, the time unit comprises a slot; and the indicated quantity comprises a quantity of resources the UE supports per slot.

In some aspects, the indicated quantity comprises a maximum quantity of configured CLI resources the UE supports per slot for measuring at least one of: CLI reference signal received power (RSRP) measurement resources, CLI reference signal strength indicator (RSSI) measurement resources, or CLI signal to interference and noise ratio (SINR) measurement resources.

In some aspects, the indicated quantity comprises a maximum quantity of resources the UE supports per slot for CLI and channel state information (CSI) measurement.

In some aspects, the frequency unit comprises a component carrier (CC); and the indicated quantity comprises a maximum quantity of configured CLI resources per CC.

In some aspects, the indicated quantity comprises a maximum quantity of configured CLI resources the UE supports per CC for measuring at least one of: CLI reference signal received power (RSRP) measurement resources, CLI reference signal strength indicator (RSSI) measurement resources, or CLI signal to interference and noise ratio (SINR) measurement resources.

In some aspects, the indicated quantity comprises a maximum quantity of configured resources the UE supports per CC for CLI and non-zero power (NZP) channel state information (CSI) measurement.

In some aspects, the indicated quantity comprises a total quantity of configured CLI resources the UE simultaneously supports per CC for CLI and NZP CSI measurement.

In some aspects, the indicated quantity comprises at least one of: a total quantity of configured CLI resources the UE simultaneously supports per CC for measuring at least one of: CLI RSRP measurement resources, CLI RSSI measurement resources, or CLI SINR measurement resources; or a maximum quantity of CLI ports the UE supports across configured CLI resources per CC for measuring at least one of: RSRP, RSSI, or SINR.

In some aspects, the indicated quantity comprises a maximum quantity of CLI ports the UE supports across configured resources per CC for CLI and NZP CSI measurement.

In some aspects, the indicated quantity comprises a total quantity of ports in simultaneous CLI resources the UE simultaneously supports per CC for measuring at least one of: CLI RSRP measurement resources, CLI RSSI measurement resources, or CLI SINR measurement resources.

In some aspects, the indicated quantity comprises a total quantity of ports in simultaneous CLI and NZP CSI resources the UE simultaneously supports per CC for CLI and NZP CSI measurement.

In some aspects, the indicated quantity comprises at least one of: a maximum quantity of simultaneous CLI resources the UE simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources; or a total quantity of CLI ports the UE simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources.

In some aspects, the indicated quantity comprises at least one of: a maximum quantity of simultaneous CLI resources the UE simultaneously supports in active bandwidth parts (BWPs) across at least one of CCs, a master cell group (MCG), or secondary cell group (SCG) for CLI and NZP CSI measurement; or a total quantity of CLI ports the UE simultaneously supports in active bandwidth parts (BWPs) across at least one of CCs, a master cell group (MCG), or secondary cell group (SCG) for CLI and NZP CSI measurement.

Figure 18:
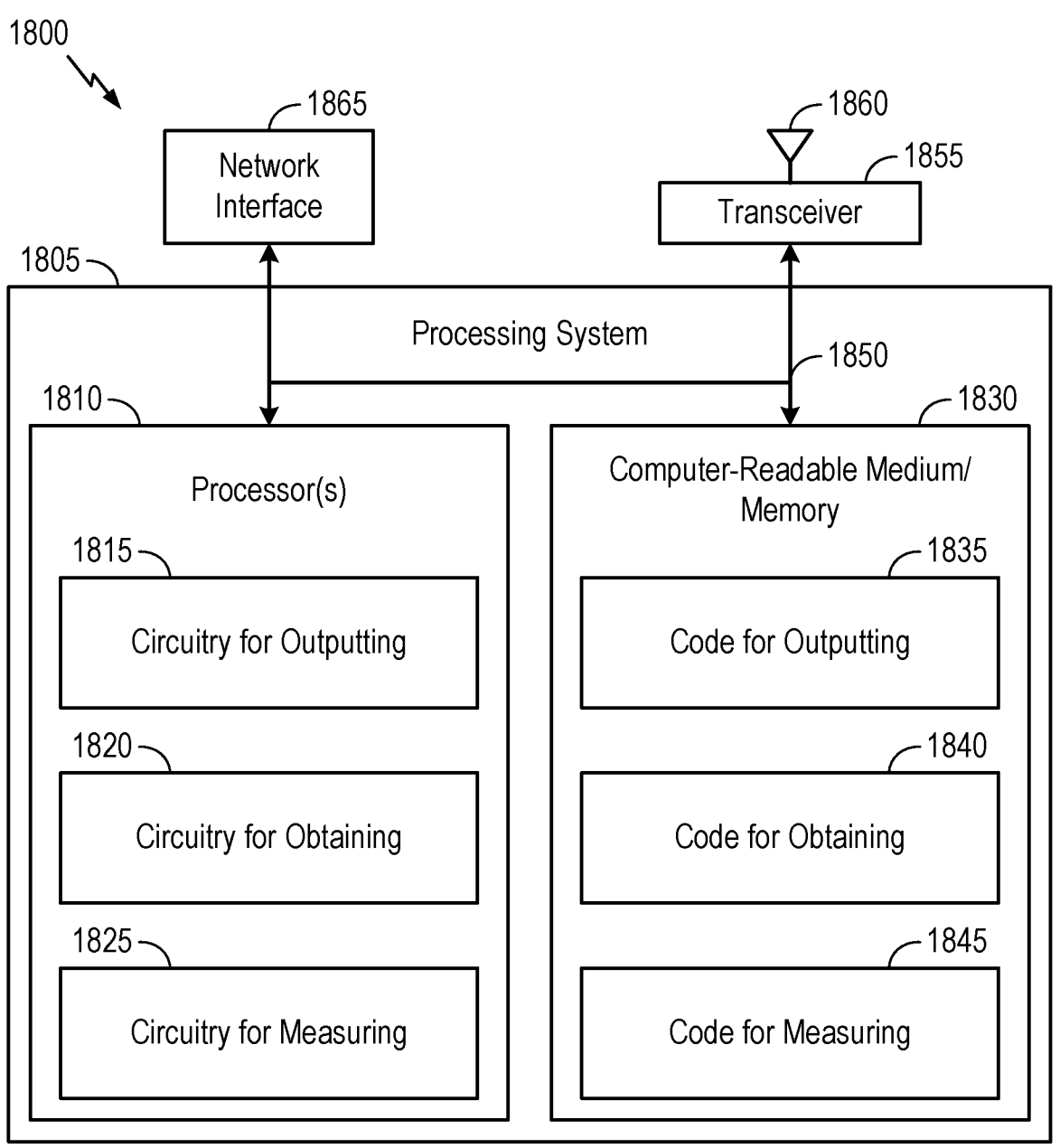
FIG. 18 depicts aspects of an example communications device.

In one aspect, method 1600, or any aspect related to it, may be performed by an apparatus, such as communications device 1800 of FIG. 18, which includes various components operable, configured, or adapted to perform the method 1600. Communications device 1800 is described below in further detail.

Note that FIG. 16 is just one example of a method, and other methods including fewer, additional, or alternative steps are possible consistent with this disclosure.

Figure 17:
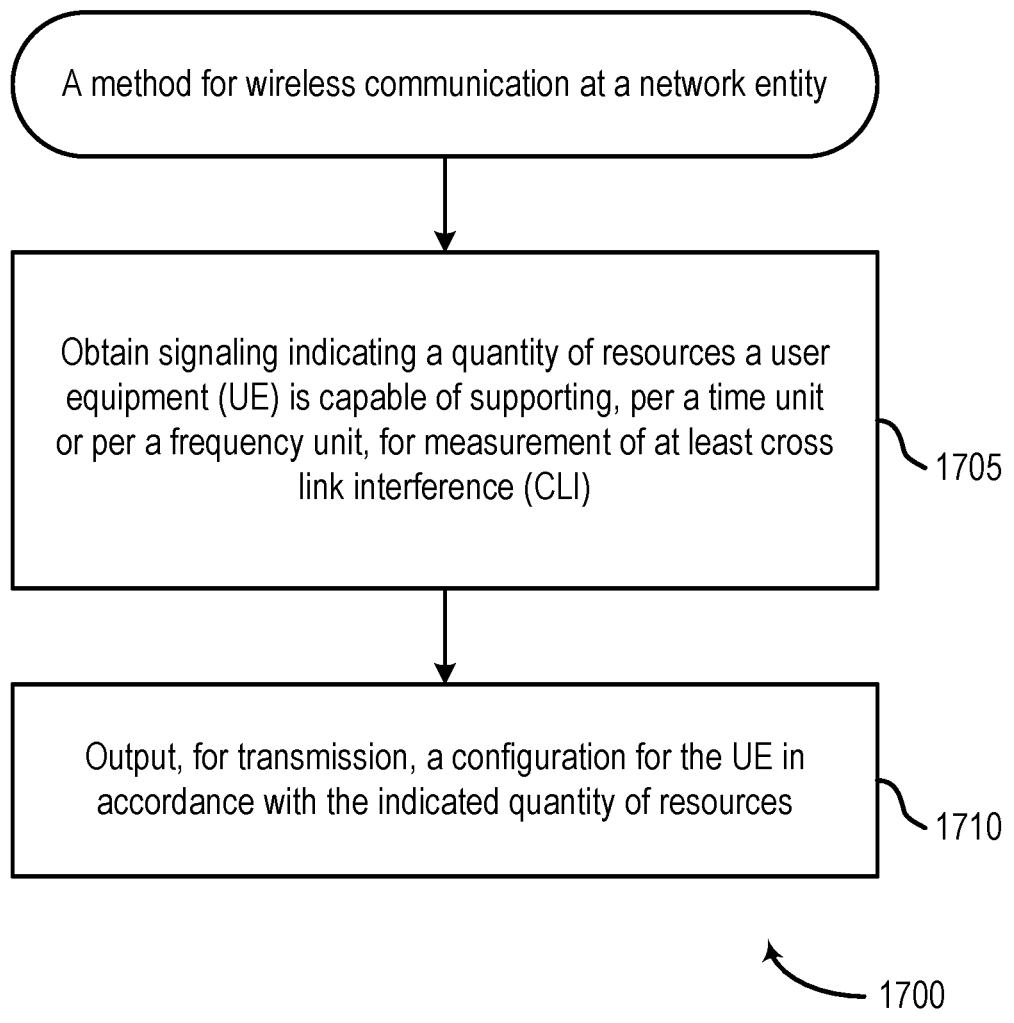
FIG. 17 depicts a method for wireless communications.

FIG. 17 shows an example of a method 1700 of wireless communication at a network entity, such as a BS 102 of FIGS. 1 and 3, or a disaggregated base station as discussed with respect to FIG. 2.

Method 1700 begins at step 1705 with obtaining signaling indicating a quantity of resources a user equipment (UE) is capable of supporting, per a time unit or per a frequency unit, for measurement of at least cross link interference (CLI). In some cases, the operations of this step refer to, or may be performed by, circuitry for obtaining and/or code for obtaining as described with reference to FIG. 18.

Method 1700 then proceeds to step 1710 with outputting, for transmission, a configuration for the UE in accordance with the indicated quantity of resources. In some cases, the operations of this step refer to, or may be performed by, circuitry for outputting and/or code for outputting as described with reference to FIG. 18.

In some aspects, the time unit comprises a slot; and the indicated quantity comprises a quantity of resources the UE supports per slot.

In some aspects, the indicated quantity comprises at least one of: a maximum quantity of configured CLI resources the UE supports per slot for measuring at least one of: CLI reference signal received power (RSRP) measurement resources, CLI reference signal strength indicator (RSSI) measurement resources, or CLI signal to interference and noise ratio (SINR) measurement resources; or a maximum quantity of resources the UE supports per slot for CLI and channel state information (CSI) measurement.

In some aspects, the frequency unit comprises a component carrier (CC); and the indicated quantity comprises a maximum quantity of configured CLI resources per CC.

In some aspects, the indicated quantity comprises a maximum quantity of configured CLI resources the UE supports per CC for measuring at least one of: CLI reference signal received power (RSRP) measurement resources, CLI reference signal strength indicator (RSSI) measurement resources, or CLI signal to interference and noise ratio (SINR) measurement resources.

In some aspects, the indicated quantity comprises a maximum quantity of configured resources the UE supports per CC for CLI and non-zero power (NZP) channel state information (CSI) measurement.

In some aspects, the indicated quantity comprises a total quantity of configured CLI resources the UE simultaneously supports per CC for CLI and NZP CSI measurement.

In some aspects, the indicated quantity comprises at least one of: a total quantity of configured CLI resources the UE simultaneously supports per CC for measuring at least one of: CLI RSRP measurement resources, CLI RSSI measurement resources, or CLI SINR measurement resources; or a maximum quantity of CLI ports the UE supports across configured CLI resources per CC for measuring at least one of: RSRP, RSSI, or SINR.

In some aspects, the indicated quantity comprises a maximum quantity of CLI ports the UE supports across configured resources per CC for CLI and NZP CSI measurement.

In some aspects, the indicated quantity comprises at least one of: a total quantity of ports in simultaneous CLI resources the UE simultaneously supports per CC for measuring at least one of: CLI RSRP measurement resources, CLI RSSI measurement resources, or CLI SINR measurement resources; a maximum quantity of simultaneous CLI resources the UE simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources; or a total quantity of CLI ports the UE simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources.

In some aspects, the indicated quantity comprises at least one of: a total quantity of ports in simultaneous CLI and NZP CSI resources the UE simultaneously supports per CC for CLI and NZP CSI measurement; a maximum quantity of simultaneous CLI resources the UE simultaneously supports in active bandwidth parts (BWPs) across at least one of CCs, a master cell group (MCG), or secondary cell group (SCG) for CLI and NZP CSI measurement; or a total quantity of CLI ports the UE simultaneously supports in active bandwidth parts (BWPs) across at least one of CCs, a master cell group (MCG), or secondary cell group (SCG) for CLI and NZP CSI measurement.

In one aspect, method 1700, or any aspect related to it, may be performed by an apparatus, such as communications device 1800 of FIG. 18, which includes various components operable, configured, or adapted to perform the method 1700. Communications device 1800 is described below in further detail.

Note that FIG. 17 is just one example of a method, and other methods including fewer, additional, or alternative steps are possible consistent with this disclosure.

Example Communications Device(s)

FIG. 18 depicts aspects of an example communications device 1800. In some aspects, communications device 1800 is a user equipment, such as UE 104 described above with respect to FIGS. 1 and 3. In some aspects, communications device 1800 is a network entity, such as BS 102 of FIGS. 1 and 3, or a disaggregated base station as discussed with respect to FIG. 2.

The communications device 1800 includes a processing system 1805 coupled to the transceiver 1855 (e.g., a transmitter and/or a receiver). In some aspects (e.g., when communications device 1800 is a network entity), processing system 1805 may be coupled to a network interface 1865 that is configured to obtain and send signals for the communications device 1800 via communication link(s), such as a backhaul link, midhaul link, and/or fronthaul link as described herein, such as with respect to FIG. 2. The transceiver 1855 is configured to transmit and receive signals for the communications device 1800 via the antenna 1860, such as the various signals as described herein. The processing system 1805 may be configured to perform processing functions for the communications device 1800, including processing signals received and/or to be transmitted by the communications device 1800.

The processing system 1805 includes one or more processors 1810. In various aspects, the one or more processors 1810 may be representative of one or more of receive processor 358, transmit processor 364, TX MIMO processor 366, and/or controller/processor 380, as described with respect to FIG. 3. In various aspects, one or more processors 1810 may be representative of one or more of receive processor 338, transmit processor 320, TX MIMO processor 330, and/or controller/processor 340, as described with respect to FIG. 3. The one or more processors 1810 are coupled to a computer-readable medium/memory 1830 via a bus 1850. In certain aspects, the computer-readable medium/memory 1830 is configured to store instructions (e.g., computer-executable code) that when executed by the one or more processors 1810, cause the one or more processors 1810 to perform the method 1600 described with respect to FIG. 16, or any aspect related to it; and the method 1700 described with respect to FIG. 17, or any aspect related to it. Note that reference to a processor performing a function of communications device 1800 may include one or more processors 1810 performing that function of communications device 1800.

In the depicted example, computer-readable medium/memory 1830 stores code (e.g., executable instructions), such as code for outputting 1835, code for obtaining 1840, and code for measuring 1845. Processing of the code for outputting 1835, code for obtaining 1840, and code for measuring 1845 may cause the communications device 1800 to perform the method 1600 described with respect to FIG. 16, or any aspect related to it; and the method 1700 described with respect to FIG. 17, or any aspect related to it.

The one or more processors 1810 include circuitry configured to implement (e.g., execute) the code stored in the computer-readable medium/memory 1830, including circuitry for outputting 1815, circuitry for obtaining 1820, and circuitry for measuring 1825. Processing with circuitry for outputting 1815, circuitry for obtaining 1820, and circuitry for measuring 1825 may cause the communications device 1800 to perform the method 1600 described with respect to FIG. 16, or any aspect related to it; and the method 1700 described with respect to FIG. 17, or any aspect related to it.

Various components of the communications device 1800 may provide means for performing the method 1600 described with respect to FIG. 16, or any aspect related to it; and the method 1700 described with respect to FIG. 17, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1855 and the antenna 1860 of the communications device 1800 in FIG. 18. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1855 and the antenna 1860 of the communications device 1800 in FIG. 18.

Example Clauses

Implementation examples are described in the following numbered clauses:

Clause 1: A method for wireless communication at a wireless node, comprising: outputting, for transmission, signaling indicating a quantity of resources the wireless node is capable of supporting, per a time unit or per a frequency unit, for measurement of at least cross link interference (CLI); obtaining a configuration in accordance with the indicated quantity of resources; measuring the CLI in accordance with the configuration; and outputting, for transmission, a CLI report based on the measuring.

Clause 2: The method of Clause 1, wherein: the time unit comprises a slot; and the indicated quantity comprises a quantity of resources the wireless node supports per slot.

Clause 3: The method of Clause 2, wherein the indicated quantity comprises a maximum quantity of configured CLI resources the wireless node supports per slot for measuring at least one of: CLI reference signal received power (RSRP) measurement resources, CLI reference signal strength indicator (RSSI) measurement resources, or CLI signal to interference and noise ratio (SINR) measurement resources.

Clause 4: The method of Clause 2, wherein the indicated quantity comprises a maximum quantity of resources the wireless node supports per slot for CLI and channel state information (CSI) measurement.

Clause 5: The method of any one of Clauses 1-4, wherein: the frequency unit comprises a component carrier (CC); and the indicated quantity comprises a maximum quantity of configured CLI resources per CC.

Clause 6: The method of Clause 5, wherein the indicated quantity comprises a maximum quantity of configured CLI resources the wireless node supports per CC for measuring at least one of: CLI reference signal received power (RSRP) measurement resources, CLI reference signal strength indicator (RSSI) measurement resources, or CLI signal to interference and noise ratio (SINR) measurement resources.

Clause 7: The method of Clause 6, wherein the indicated quantity comprises a maximum quantity of configured resources the wireless node supports per CC for CLI and non-zero power (NZP) channel state information (CSI) measurement.

Clause 8: The method of Clause 7, wherein the indicated quantity comprises a total quantity of configured CLI resources the wireless node simultaneously supports per CC for CLI and NZP CSI measurement.

Clause 9: The method of Clause 6, wherein the indicated quantity comprises at least one of: a total quantity of configured CLI resources the wireless node simultaneously supports per CC for measuring at least one of: CLI RSRP measurement resources, CLI RSSI measurement resources, or CLI SINR measurement resources; or a maximum quantity of CLI ports the wireless node supports across configured CLI resources per CC for measuring at least one of: RSRP, RSSI, or SINR.

Clause 10: The method of Clause 9, wherein the indicated quantity comprises a maximum quantity of CLI ports the wireless node supports across configured resources per CC for CLI and NZP CSI measurement.

Clause 11: The method of Clause 6, wherein the indicated quantity comprises a total quantity of ports in simultaneous CLI resources the wireless node simultaneously supports per CC for measuring at least one of: CLI RSRP measurement resources, CLI RSSI measurement resources, or CLI SINR measurement resources.

Clause 12: The method of Clause 11, wherein the indicated quantity comprises a total quantity of ports in simultaneous CLI and NZP CSI resources the wireless node simultaneously supports per CC for CLI and NZP CSI measurement.

Clause 13: The method of Clause 6, wherein the indicated quantity comprises at least one of: a maximum quantity of simultaneous CLI resources the wireless node simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources; or a total quantity of CLI ports the wireless node simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources.

Clause 14: The method of Clause 13, wherein the indicated quantity comprises at least one of: a maximum quantity of simultaneous CLI resources the wireless node simultaneously supports in active bandwidth parts (BWPs) across at least one of CCs, a master cell group (MCG), or secondary cell group (SCG) for CLI and NZP CSI measurement; or a total quantity of CLI ports the wireless node simultaneously supports in active bandwidth parts (BWPs) across at least one of CCs, a master cell group (MCG), or secondary cell group (SCG) for CLI and NZP CSI measurement.

Clause 15: A method for wireless communication at a wireless node, comprising: obtaining signaling indicating a quantity of resources a user equipment (UE) is capable of supporting, per a time unit or per a frequency unit, for measurement of at least cross link interference (CLI); and outputting, for transmission, a configuration for the UE in accordance with the indicated quantity of resources.

Clause 16: The method of Clause 15, wherein: the time unit comprises a slot; and the indicated quantity comprises a quantity of resources the UE supports per slot.

Clause 17: The method of Clause 16, wherein the indicated quantity comprises at least one of: a maximum quantity of configured CLI resources the UE supports per slot for measuring at least one of: CLI reference signal received power (RSRP) measurement resources, CLI reference signal strength indicator (RSSI) measurement resources, or CLI signal to interference and noise ratio (SINR) measurement resources; or a maximum quantity of resources the UE supports per slot for CLI and channel state information (CSI) measurement.

Clause 18: The method of any one of Clauses 15-17, wherein: the frequency unit comprises a component carrier (CC); and the indicated quantity comprises a maximum quantity of configured CLI resources per CC.

Clause 19: The method of Clause 18, wherein the indicated quantity comprises a maximum quantity of configured CLI resources the UE supports per CC for measuring at least one of: CLI reference signal received power (RSRP) measurement resources, CLI reference signal strength indicator (RSSI) measurement resources, or CLI signal to interference and noise ratio (SINR) measurement resources.

Clause 20: The method of Clause 19, wherein the indicated quantity comprises a maximum quantity of configured resources the UE supports per CC for CLI and non-zero power (NZP) channel state information (CSI) measurement.

Clause 21: The method of Clause 20, wherein the indicated quantity comprises a total quantity of configured CLI resources the UE simultaneously supports per CC for CLI and NZP CSI measurement.

Clause 22: The method of Clause 19, wherein the indicated quantity comprises at least one of: a total quantity of configured CLI resources the UE simultaneously supports per CC for measuring at least one of: CLI RSRP measurement resources, CLI RSSI measurement resources, or CLI SINR measurement resources; or a maximum quantity of CLI ports the UE supports across configured CLI resources per CC for measuring at least one of: RSRP, RSSI, or SINR.

Clause 23: The method of Clause 22, wherein the indicated quantity comprises a maximum quantity of CLI ports the UE supports across configured resources per CC for CLI and NZP CSI measurement.

Clause 24: The method of Clause 19, wherein the indicated quantity comprises at least one of: a total quantity of ports in simultaneous CLI resources the UE simultaneously supports per CC for measuring at least one of: CLI RSRP measurement resources, CLI RSSI measurement resources, or CLI SINR measurement resources; a maximum quantity of simultaneous CLI resources the UE simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources; or a total quantity of CLI ports the UE simultaneously supports in active bandwidth parts (BWPs) across at least one of CCs, a master cell group (MCG), or secondary cell group (SCG) for measuring at least one of: CLI RSRP measurement resources, CLI RSSI measurement resources, or CLI SINR measurement resources.

Clause 25: The method of Clause 24, wherein the indicated quantity comprises at least one of: a total quantity of ports in simultaneous CLI and NZP CSI resources the UE simultaneously supports per CC for CLI and NZP CSI measurement; a maximum quantity of simultaneous CLI resources the UE simultaneously supports in active bandwidth parts (BWPs) across at least one of CCs, a master cell group (MCG), or secondary cell group (SCG) for CLI and NZP CSI measurement; or a total quantity of CLI ports the UE simultaneously supports in active bandwidth parts (BWPs) across at least one of CCs, a master cell group (MCG), or secondary cell group (SCG) for CLI and NZP CSI measurement.

Clause 26: The method of any one of Clauses 15-25, further comprising at least one transceiver configured to receive the signaling and transmit the configuration.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Clause 31: A user equipment (UE) comprising: at least one transceiver, at least one memory comprising executable instructions; and at least one processor configured to execute the executable instructions and cause the UE to perform a method in accordance with any one of Clauses 1-14, wherein the at least one transceiver is configured to transmit the signaling indicating a quantity of resources the UE is capable of supporting.

Clause 32: A network entity comprising: at least one transceiver, at least one memory comprising executable instructions; and at least one processor configured to execute the executable instructions and cause the network entity to perform a method in accordance with any one of Clauses 15-26, wherein the at least one transceiver is configured to receive the signaling indicating a quantity of resources the user equipment (UE) is capable of supporting.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising: at least one transceiver; at least one memory comprising computer-executable instructions; and one or more processors configured to execute the computer-executable instructions to cause the apparatus to:

transmit, via the at least one transceiver, signaling indicating a quantity of resources the apparatus is capable of supporting, per a time unit or per a frequency unit, wherein the frequency unit comprises a component carrier (CC) and the indicated quantity of resources comprises a maximum quantity of CLI resources per CC;

receive, via the at least one transceiver and after transmitting the signaling, a configuration;

measure a cross link interference (CLI) in accordance with the configuration; and transmit, via the at least one transceiver, a CLI report based on the measuring.

2. The apparatus of claim 1, wherein:
the time unit comprises a slot; and
the indicated quantity of resources comprises a quantity of resources the apparatus supports per slot.

3. The apparatus of claim 2, wherein the indicated quantity of resources comprises a maximum quantity of CLI resources the apparatus supports per slot associated with at least one of: CLI reference signal received power (RSRP) measurement, CLI reference signal strength indicator (RSSI) measurement, or CLI signal to interference and noise ratio (SINR) measurement.

4. The apparatus of claim 2, wherein the indicated quantity of resources comprises a maximum quantity of resources the apparatus supports per slot associated with CLI measurement and channel state information (CSI).

5. The apparatus of claim 1, wherein the indicated CLI resources per CC comprise at least one of: CLI reference signal received power (RSRP) measurement resources, CLI reference signal strength indicator (RSSI) measurement resources, or CLI signal to interference and noise ratio (SINR) measurement resources.

6. The apparatus of claim 1, wherein the quantity is indicated via a parameter associated with the CLI and a non-zero power (NZP) channel state information (CSI).

7. The apparatus of claim 1, wherein the signaling further indicates a total quantity of CLI resources the apparatus supports per CC associated with CLI measurement and NZP CSI measurement.

8. The apparatus of claim 1, wherein the signaling further indicates at least one of:
a total quantity of CLI resources the apparatus supports per CC associated with at least one of: CLI RSRP measurement, CLI RSSI measurement, or CLI SINR measurement; or
a maximum quantity of CLI ports the apparatus supports across CLI resources per CC associated with at least one of: RSRP measurement, RSSI measurement, or SINR measurement.

9. The apparatus of claim 1, wherein the signaling further indicates a maximum quantity of CLI ports the apparatus supports across CLI resources per CC associated with CLI measurement and NZP CSI measurement.

10. The apparatus of claim 1, wherein the signaling further indicates a total quantity of ports the apparatus supports per CC associated with at least one of: CLI RSRP measurement, CLI RSSI measurement, or CLI SINR measurement.

11. The apparatus of claim 1, wherein the signaling further indicates a total quantity of ports the apparatus supports per CC associated with CLI measurement and NZP CSI measurement.

12. The apparatus of claim 1, wherein the signaling further indicates at least one of:
a maximum quantity of CLI resources the apparatus supports in active bandwidth parts (BWPs) across at least one of CCs, a master cell group (MCG), or secondary cell group (SCG) associated with at least one of: CLI RSRP measurement, CLI RSSI measurement, or CLI SINR measurement; or
a total quantity of CLI ports the apparatus supports in active bandwidth parts (BWPs) across at least one of CCs, a master cell group (MCG), or secondary cell group (SCG) associated with at least one of: CLI RSRP measurement, CLI RSSI measurement, or CLI SINR measurement.

13. The apparatus of claim 1, wherein the signaling further indicates at least one of:

a maximum quantity of CLI resources the apparatus supports in active bandwidth parts (BWPs) across at least one of CCs, a master cell group (MCG), or secondary cell group (SCG) associated with CLI measurement and NZP CSI measurement; or a total quantity of CLI ports the apparatus supports in active bandwidth parts (BWPs) across at least one of CCs, a master cell group (MCG), or secondary cell group (SCG) associated with CLI measurement and NZP CSI measurement.

14. The apparatus of claim 1, wherein the apparatus is configured as user equipment.

15. An apparatus for wireless communication, comprising: at least one transceiver; at least one memory comprising computer-executable instructions; and one or more processors configured to execute the computer-executable instructions to cause the apparatus to:

receive, via the at least one transceiver, signaling indicating a quantity of resources a user equipment (UE) is capable of supporting, per a time unit or per a frequency unit, wherein the frequency unit comprises a component carrier (CC) and the indicated quantity of resources comprises a maximum quantity of CLI resources per CC; and transmit, via the at least one transceiver, a configuration for the UE in accordance with the indicated quantity of resources.

16. The apparatus of claim 15, wherein:

the time unit comprises a slot; and the indicated quantity of resources comprises a quantity of resources the UE supports per slot.

17. The apparatus of claim 16, wherein the indicated quantity of resources comprises at least one of:

a maximum quantity of CLI resources the UE supports per slot associated with at least one of: CLI reference signal received power (RSRP) measurement, CLI reference signal strength indicator (RSSI) measurement resources, or CLI signal to interference and noise ratio (SINR) measurement; or a maximum quantity of resources the UE supports per slot associated with CLI measurement and channel state information (CSI) measurement.

18. The apparatus of claim 15, wherein the indicated CLI resources per CC comprise at least one of: CLI reference signal received power (RSRP) measurement resources, CLI reference signal strength indicator (RSSI) measurement resources, or CLI signal to interference and noise ratio (SINR) measurement resources.

19. The apparatus of claim 15, wherein the quantity is indicated via a parameter associated with the CLI and a non-zero power (NZP) channel state information (CSI).

20. The apparatus of claim 15, wherein the signaling further indicates a total quantity of CLI resources the UE supports per CC associated with CLI measurement and NZP CSI measurement.

21. The apparatus of claim 15, wherein the signaling further indicates at least one of:

a total quantity of CLI resources the UE supports per CC associated with at least one of: CLI RSRP measurement, CLI RSSI measurement, or CLI SINR measurement; or a maximum quantity of CLI ports the UE supports across CLI resources per CC associated with at least one of: RSRP measurement, RSSI measurement, or SINR measurement.

22. The apparatus of claim 15, wherein the signaling further indicates a maximum quantity of CLI ports the UE supports across CLI resources per CC associated with CLI measurement and NZP CSI measurement.

23. The apparatus of claim 15, wherein the signaling further indicates at least one of:

a total quantity of ports the UE supports per CC associated with at least one of: CLI RSRP measurement, CLI RSSI measurement, or CLI SINR measurement;

a maximum quantity of CLI resources the UE supports in active bandwidth parts (BWPs) across at least one of CCs, a master cell group (MCG), or secondary cell group (SCG) associated with at least one of: CLI RSRP measurement, CLI RSSI measurement, or CLI SINR measurement; or a total quantity of CLI ports the UE supports in active bandwidth parts (BWPs) across at least one of CCs, a master cell group (MCG), or secondary cell group (SCG) associated with at least one of: CLI RSRP measurement, CLI RSSI measurement, or CLI SINR measurement.

24. The apparatus of claim 15, wherein the signaling further indicates at least one of:

a total quantity of ports the UE supports per CC associated with CLI measurement and NZP CSI measurement;

a maximum quantity of CLI resources the UE supports in active bandwidth parts (BWPs) across at least one of CCs, a master cell group (MCG), or secondary cell group (SCG) associated with CLI measurement and NZP CSI measurement; or a total quantity of CLI ports the UE supports in active bandwidth parts (BWPs) across at least one of CCs, a master cell group (MCG), or secondary cell group (SCG) associated with CLI measurement and NZP CSI measurement.

25. The apparatus of claim 15, wherein the apparatus is configured as a network entity.

26. A method for wireless communication by a wireless node, comprising:

transmitting signaling indicating a quantity of resources the UE is capable of supporting, per a time unit or per a frequency unit, wherein the frequency unit comprises a component carrier (CC) and the indicated quantity of resources comprises a maximum quantity of CLI resources per CC;

receiving, after transmitting the signaling, a configuration;

measuring the CLI in accordance with the configuration; and transmitting a CLI report based on the measuring.

* * * * *